United States Patent
Ootake et al.

(10) Patent No.: US 12,185,419 B2
(45) Date of Patent: Dec. 31, 2024

(54) MOBILE COMMUNICATION SYSTEM AND CONTROL METHOD

(71) Applicant: NEC Corporation, Tokyo (JP)

(72) Inventors: Masaaki Ootake, Tokyo (JP); Hiroaki Aminaka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 290 days.

(21) Appl. No.: 17/911,199

(22) PCT Filed: Mar. 22, 2021

(86) PCT No.: PCT/JP2021/011601
§ 371 (c)(1),
(2) Date: Sep. 13, 2022

(87) PCT Pub. No.: WO2021/200321
PCT Pub. Date: Oct. 7, 2021

(65) Prior Publication Data
US 2023/0108670 A1 Apr. 6, 2023

(30) Foreign Application Priority Data

Mar. 31, 2020 (JP) .................. 2020-062965

(51) Int. Cl.
*H04W 8/08* (2009.01)
*H04W 8/22* (2009.01)
*H04W 28/12* (2009.01)

(52) U.S. Cl.
CPC .............. *H04W 8/08* (2013.01); *H04W 8/22* (2013.01); *H04W 28/12* (2013.01)

(58) Field of Classification Search
CPC ......... H04W 8/08; H04W 8/22; H04W 28/12; H04W 4/24; H04W 8/12; H04W 8/18;
(Continued)

(56) References Cited

U.S. PATENT DOCUMENTS 11,184,953 B2 * 11/2021 Panchal ................ H04M 15/00
2004/0127191 A1 7/2004 Matsunaga
(Continued)

FOREIGN PATENT DOCUMENTS

JP 2004-207839 A 7/2004
JP 2009-060266 A 3/2009
(Continued)

OTHER PUBLICATIONS

Hagen, Lars, Markus Breugst, and Thomas Magedanz. "Impacts of mobile agent technology on mobile communication system evolution." IEEE Personal communications 5.4 (1998): 56-69. (Year: 1998).*

(Continued)

*Primary Examiner* — Sharad Rampuria
(74) *Attorney, Agent, or Firm* — Sughre Mion, PLLC

(57) ABSTRACT

In order to appropriately perform, in a mobile communication system including a plurality of mobile communication networks respectively operated by a plurality of mobile communication operators, cooperation among respective mobile communication networks, a system 2 includes a control apparatus including a second control unit that performs, via a first mobile communication network 1a operated by a mobile communication operator A, for a second mobile communication network 1b operated by a mobile communication operator B different from the first mobile communication operator A, control related to mobility for a terminal apparatus connected to the second mobile communication network 1b, and a control apparatus including a first control unit that performs, not via another mobile communication network different from the second mobile communication network 1b, for the second mobile communication network 1b, control related to mobility for the terminal (Continued)

apparatus connected to the second mobile communication network 1*b*.

7 Claims, 12 Drawing Sheets

(58) Field of Classification Search
CPC ..... H04W 16/14; H04W 28/02; H04M 15/41; H04M 15/80; H04M 15/8016; H04M 15/8033; H04M 15/8038; H04M 15/00
See application file for complete search history.

(56) References Cited

U.S. PATENT DOCUMENTS

| | | |
|---|---|---|
| 2010/0330957 A1 | 12/2010 | Harada et al. |
| 2012/0210003 A1 | 8/2012 | Castro et al. |
| 2012/0218897 A1 | 8/2012 | Aramoto et al. |
| 2013/0095826 A1 | 4/2013 | Vrbaski et al. |
| 2013/0301609 A1 | 11/2013 | Smith et al. |
| 2018/0249015 A1 | 8/2018 | Nakano et al. |
| 2019/0028900 A1 | 1/2019 | Furuichi |
| 2020/0153975 A1 | 5/2020 | Nakano et al. |
| 2020/0351882 A1* | 11/2020 | Furuichi ............... H04W 16/28 |
| 2021/0084172 A1 | 3/2021 | Nakano et al. |
| 2021/0168676 A1* | 6/2021 | Jiang .................... H04W 48/18 |

FOREIGN PATENT DOCUMENTS

| | | |
|---|---|---|
| JP | 2011-015021 A | 1/2011 |
| JP | 2013-502786 A | 1/2013 |
| JP | 2013-247488 A | 12/2013 |
| JP | 2014-534709 A | 12/2014 |
| JP | 2015-057914 A | 3/2015 |
| JP | 2016-512670 A | 4/2016 |
| JP | 2016-163307 A | 9/2016 |
| JP | 2017-034470 A | 2/2017 |
| JP | 2017-038216 A | 2/2017 |
| JP | 2017-135686 A | 8/2017 |
| JP | 2017-208670 A | 11/2017 |
| JP | 2020-036188 A | 3/2020 |
| WO | 2011/055787 A1 | 5/2011 |
| WO | 2014/049668 A1 | 4/2014 |
| WO | 2016/148229 A1 | 9/2016 |
| WO | 2017/130494 A1 | 8/2017 |
| WO | 2019/142440 A1 | 7/2019 |

OTHER PUBLICATIONS

Written opinion for PCT Application No. PCT/JP2021/011591, mailed on Jun. 15, 2021 with English translation.
Written opinion for PCT Application No. PCT/JP2021/011592, mailed on May 25, 2021 with English translation.
Written opinion for PCT Application No. PCT/JP2021/011594, mailed on Jun. 15, 2021 with English translation.
Written opinion for PCT Application No. PCT/JP2021/011601, mailed on Jun. 22, 2021 with English translation.
JP Office Action for JP Application No. 2022-511944, mailed on Nov. 28, 2023 with English Translation.
JP Office Communication for JP Application No. 2022-511946, mailed on Jan. 23, 2024 with English Translation.
Orange, Huawei, "Extreme Long Range Communications—Discussion paper". 3GPP TSG SA WG1 #82 S1-181327, May 15, 2018, pp. 1-pp. 3.
International Search Report for PCT Application No. PCT/JP2021/011591, mailed on Jun. 15, 2021.
International Search Report for PCT Application No. PCT/JP2021/011592, mailed on May 25, 2021.
International Search Report for PCT Application No. PCT/JP2021/011594, mailed on Jun. 15, 2021.
International Search Report for PCT Application No. PCT/JP2021/011601, mailed on Jun. 22, 2021.

* cited by examiner

| ADMINISTRATOR OF TERMINAL APPARATUS | COMMUNICATION FEE |
|---|---|
| A MOBILE COMMUNICATION OPERATOR A | NOT INCREASED OR REDUCED |
| B MOBILE COMMUNICATION OPERATOR B | REDUCED (e.g. -¥10/min) |

Fig. 4

MOBILE COMMUNICATION SYSTEM AND CONTROL METHOD

This application is a National Stage Entry of PCT/JP2021/011601 filed on Mar. 22, 2021, which claims priority from Japanese Patent Application 2020-062965 filed on Mar. 31, 2020, the contents of all of which are incorporated herein by reference, in their entirety.

TECHNICAL FIELD

The present invention relates to a mobile communication system and a control method.

BACKGROUND ART

For example, as described in PTLs 1 and 2, a mobile communication system such as a Long Term Evolution (LTE) system has been applied to a field of public safety.

CITATION LIST

Patent Literature

[PTL 1] JP 2016-163307 A
[PTL 2] JP 2016-512670 T

SUMMARY

Technical Problem

In the mobile communication system described above, a case in which users themselves of mobile communication operate network facilities as mobile communication operators may be assumed. When each of a plurality of mobile communication operators operates a facility for a mobile communication network as described above, it is desirable that cooperation be appropriately performed among the mobile communication networks respectively managed by the plurality of mobile communication operators.

However, in the techniques described in above PTLs 1 and 2 and the like, no consideration is given to appropriate cooperation among a plurality of mobile communication networks respectively managed by a plurality of mobile communication operators.

An example object of the present invention is to provide, in a mobile communication system including a plurality of mobile communication networks respectively operated by a plurality of mobile communication operators, control for a mobile communication system that enables appropriate cooperation among the respective mobile communication networks.

Solution to Problem

First Aspect

According to a first aspect of the present invention, a control apparatus includes a first control unit configured to perform control related to a first mobile communication network operated by a first mobile communication operator, and a second control unit configured to perform, via the first mobile communication network, control related to mobility for a terminal apparatus connected to one or more second mobile communication networks respectively operated by one or more second mobile communication operators different from the first mobile communication operator.

According to the first aspect of the present invention, a control method includes performing control related to a first mobile communication network operated by a first mobile communication operator, and performing, via the first mobile communication network, control related to mobility for a terminal apparatus connected to one or more second mobile communication networks respectively operated by one or more second mobile communication operators different from the first mobile communication operator.

According to the first aspect of the present invention, a program causes a processor to execute performing control related to a first mobile communication network operated by a first mobile communication operator, and performing, via the first mobile communication network, control related to mobility for a terminal apparatus connected to one or more second mobile communication networks respectively operated by one or more second mobile communication operators different from the first mobile communication operator.

Second Aspect

According to a second aspect of the present invention, a node apparatus is a node apparatus in a first mobile communication network operated by a first mobile communication operator, the node apparatus including an obtaining unit configured to obtain identification information of a terminal apparatus connected to the first mobile communication network, a determining unit configured to determine whether the terminal apparatus is managed by a second mobile communication operator operating a second mobile communication network different from the first mobile communication network, based on the identification information, and a control unit configured to control charge processing related to a service provided to the terminal apparatus by the first mobile communication network, based on results of the determination.

According to the second aspect of the present invention, a control method is a control method performed by a node apparatus in a first mobile communication network operated by a first mobile communication operator, the control method including obtaining identification information of a terminal apparatus connected to the first mobile communication network, determining whether the terminal apparatus is managed by a second mobile communication operator operating a second mobile communication network different from the first mobile communication network, based on the identification information, and controlling charge processing related to a service provided to the terminal apparatus by the first mobile communication network, based on results of the determination.

According to the second aspect of the present invention, a program is a program for causing a node apparatus in a first mobile communication network operated by a first mobile communication operator to execute obtaining identification information of a terminal apparatus connected to the first mobile communication network, determining whether the terminal apparatus is managed by a second mobile communication operator operating a second mobile communication network different from the first mobile communication network, based on the identification information, and controlling charge processing related to a service provided to the terminal apparatus by the first mobile communication network, based on results of the determination.

Third Aspect

According to a third aspect of the present invention, a node apparatus is a node apparatus in a first mobile communication network operated by a first mobile communication operator, the node apparatus including an obtaining unit configured to obtain identification information of a terminal apparatus connected to the first mobile communication network, a determining unit configured to determine whether the terminal apparatus is managed by a second mobile communication operator operating a second mobile communication network different from the first mobile communication network, based on the identification information, and a control unit configured to control communication quality related to a service provided to the terminal apparatus by the first mobile communication network, based on results of the determination.

According to the third aspect of the present invention, a control method is a control method performed by a node apparatus in a first mobile communication network operated by a first mobile communication operator, the control method including obtaining identification information of a terminal apparatus connected to the first mobile communication network, determining whether the terminal apparatus is managed by a second mobile communication operator operating a second mobile communication network different from the first mobile communication network, based on the identification information, and controlling communication quality related to a service provided to the terminal apparatus by the first mobile communication network, based on results of the determination.

According to the third aspect of the present invention, a program is a program for causing a node apparatus in a first mobile communication network operated by a first mobile communication operator to execute obtaining identification information of a terminal apparatus connected to the first mobile communication network, determining whether the terminal apparatus is managed by a second mobile communication operator operating a second mobile communication network different from the first mobile communication network, based on the identification information, and controlling communication quality related to a service provided to the terminal apparatus by the first mobile communication network, based on results of the determination.

Fourth Aspect

According to a fourth aspect of the present invention, a mobile communication system includes a first control apparatus including a control unit configured to perform, via a first mobile communication network operated by a first mobile communication operator, for a second mobile communication network operated by a second mobile communication operator different from the first mobile communication operator, control related to mobility for a terminal apparatus connected to the second mobile communication network, and a second control apparatus including a first control unit configured to perform, not via another mobile communication network different from the second mobile communication network, for the second mobile communication network, control related to mobility for the terminal apparatus connected to the second mobile communication network.

According to the fourth aspect of the present invention, a control method includes performing, by a first control apparatus, via a first mobile communication network operated by a first mobile communication operator, for a second mobile communication network operated by a second mobile communication operator different from the first mobile communication operator, control related to mobility for a terminal apparatus connected to the second mobile communication network, and performing, by a second control apparatus, not via another mobile communication network different from the second mobile communication network, for the second mobile communication network, control related to mobility for the terminal apparatus connected to the second mobile communication network.

Advantageous Effects of Invention

According to the present invention, in the mobile communication system including a plurality of mobile communication networks respectively operated by a plurality of mobile communication operators, cooperation can be appropriately performed among the respective mobile communication networks. Note that, according to the present invention, instead of or together with the above effects, other effects may be exerted.

BRIEF DESCRIPTION OF THE DRAWINGS

FIG. 4 is an explanatory diagram for describing an example of charge processing for reducing a communication fee;

DESCRIPTION OF THE EXAMPLE EMBODIMENTS

Figure 1:
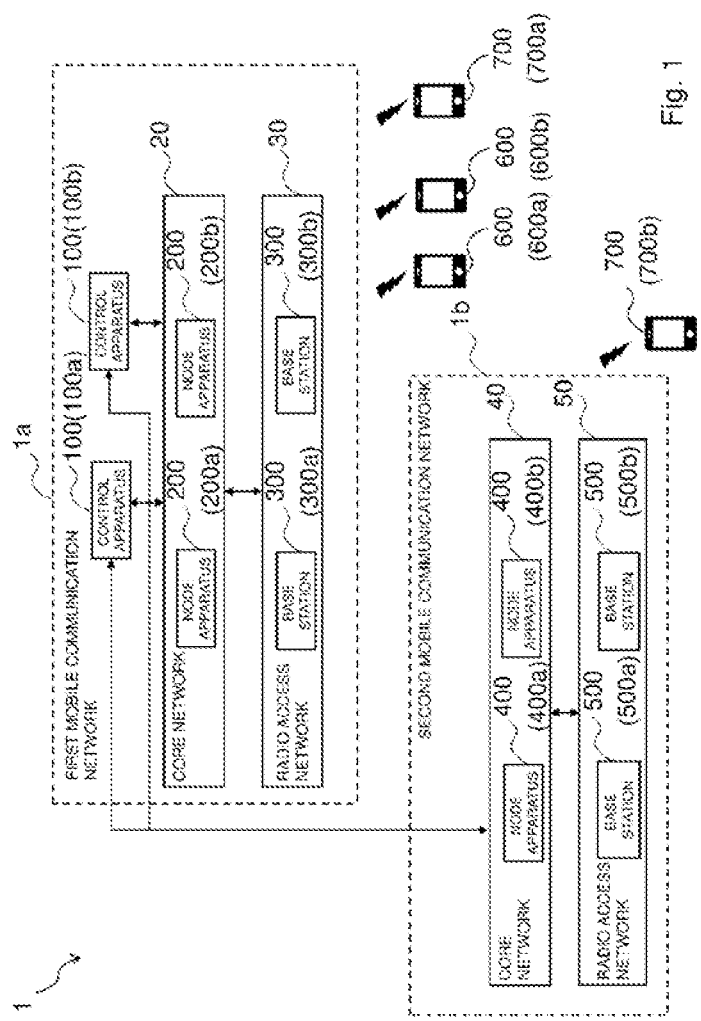
FIG. 1 is an explanatory diagram illustrating an example of a schematic configuration of a system 1 according to an example embodiment of the present invention.

Hereinafter, example embodiments of the present invention will be described in detail with reference to the accompanying drawings. Note that, in the Specification and drawings, elements to which similar descriptions are applicable are denoted by the same reference signs, and overlapping descriptions may hence be omitted.

Descriptions will be given in the following order.
1. Overview of Example Embodiments of Present Invention
2. Configuration of System 1
3. First Example Embodiment
    3.1. Configuration of Control Apparatus 100
    3.2. Configuration of Core Network Node Apparatus 200
    3.3. Operation Example
    3.4. Example Alteration
4. Second Example Embodiment
    4.1. Configuration of Control Apparatus 150
    4.2. Operation Example
5. Third Example Embodiment
    5.1. Configuration of Core Network Node Apparatus 250
    5.2. Operation Example
6. Fourth Example Embodiment
    6.1. Configuration of Core Network Node Apparatus 270
    6.2. Operation Example
7. Fifth Example Embodiment
    7.1. Configuration of Mobile Communication System 3
    7.2. Configuration of First Control Apparatus 170
    7.3. Configuration of Second Control Apparatus 850
    7.4. Operation Example
8. Other Example Embodiments
9. Supplementary Notes
    9.1. First Set of Supplementary Notes
    9.2. Second Set of Supplementary Notes
    9.3. Third Set of Supplementary Notes
    9.4. Fourth Set of Supplementary Notes 1. Overview of Example Embodiments of Present Invention First, an overview of example embodiments of the present invention will be described.

(1) Technical Issue

A mobile communication system such as a Long Term Evolution (LTE) system has been applied to a field of public safety. Regarding the network applied in such a manner, in the mobile communication system described above, a case in which users themselves of mobile communication operate network facilities as mobile communication operators is assumed.

When each of a plurality of mobile communication operators operates a facility for a mobile communication network in this manner, it is desirable that cooperation be appropriately performed among the mobile communication networks respectively operated by the plurality of mobile communication operators.

An example object of the present example embodiment is to provide, in a mobile communication system including a plurality of mobile communication networks respectively operated by a plurality of mobile communication operators, control for a mobile communication system that enables appropriate cooperation among the respective mobile communication networks.

(2) Technical Features

In the present example embodiment, for example, a control apparatus performs control related to a first mobile communication network operated by a first mobile communication operator, and performs, via the first mobile communication network, control related to mobility for a terminal apparatus connected to one or more second mobile communication networks respectively operated by one or more second mobile communication operators different from the first mobile communication operator.

In the present example embodiment, for example, a node apparatus is a node apparatus in a first mobile communication network operated by a first mobile communication operator. The node apparatus obtains identification information of a terminal apparatus connected to the first mobile communication network, determines whether the terminal apparatus is managed by a second mobile communication operator operating a second mobile communication network different from the first mobile communication network, based on the identification information, and controls charge processing related to a service provided to the terminal apparatus by the first mobile communication network, based on results of the determination.

In the present example embodiment, for example, a node apparatus is a node apparatus in a first mobile communication network operated by a first mobile communication operator. The node apparatus obtains identification information of a terminal apparatus connected to the first mobile communication network, determines whether the terminal apparatus is managed by a second mobile communication operator operating a second mobile communication network different from the first mobile communication network, based on the identification information, and controls communication quality related to a service provided to the terminal apparatus by the first mobile communication network, based on results of the determination.

In the present example embodiment, for example, a mobile communication system includes performing, by a first control apparatus, via a first mobile communication network operated by a first mobile communication operator, for a second mobile communication network operated by a second mobile communication operator different from the first mobile communication operator, control related to mobility for a terminal apparatus connected to the second mobile communication network, and performing, by a second control apparatus, not via another mobile communication network different from the second mobile communication network, for the second mobile communication network, control related to mobility for the terminal apparatus connected to the second mobile communication network.

With this, for example, in the mobile communication system including a plurality of mobile communication networks respectively operated by a plurality of mobile communication operators, cooperation can be appropriately performed among the respective mobile communication networks.

Note that the technical features described above are merely a specific example of the example embodiments of the present invention, and as a matter of course, the example embodiments of the present invention are not limited to the technical features described above.

<<2. Configuration of System 1>>

With reference to FIG. 1, an example of a configuration of a system 1 according to an example embodiment of the present invention will be described. FIG. 1 is an explanatory diagram illustrating an example of a schematic configuration of the system 1 according to an example embodiment of the present invention. With reference to FIG. 1, the system 1 includes a first mobile communication network 1*a* operated by a mobile communication operator A, a second mobile communication network 1b operated by a mobile communication operator B different from the mobile communication operator A, a plurality of terminal apparatuses 600a and 600b (hereinafter simply referred to as "terminal apparatus 600" when being referred to collectively) managed by the mobile communication operator A, and a plurality of terminal apparatuses 700a and 700b (hereinafter simply referred to as "terminal apparatus 700" when being referred to collectively) managed by the mobile communication operator B.

(First Mobile Communication Network 1a)

As illustrated in FIG. 1, for example, the first mobile communication network 1a includes a plurality of control apparatuses 100a and 100b (hereinafter simply referred to as "control apparatus 100" when being referred to collectively), a core network 20 including a plurality of core network node apparatuses 200a and 200b (hereinafter simply referred to as "core network node apparatus 200" when being referred to collectively), and a radio access network 30 including a plurality of base stations 300a and 300b (hereinafter referred to as "base station 300" when being referred to collectively). In the example illustrated in FIG. 1, the first mobile communication network 1a is connected to be capable of communication with the terminal apparatuses 600a, 600b, and 700a.

(Second Mobile Communication Network 1b)

As illustrated in FIG. 1, for example, the second mobile communication network 1b includes a core network 40 including a plurality of core network node apparatuses 400a and 400b (hereinafter referred to as "core network node apparatus 400" when being referred to collectively), and a radio access network 50 including a plurality of base stations 500a and 500b (hereinafter simply referred to as "base station 500" when being referred to collectively). In the example illustrated in FIG. 1, the second mobile communication network 1b is connected to be capable of communication with the terminal apparatus 700b.

(Implementation Example of Mobile Communication Network)

The mobile communication network described above is a network operated by each of the mobile communication operators, and is, for example, a network conforming to standards/specifications of the Third Generation Partnership Project (3GPP). More specifically, for example, the mobile communication network may be a network conforming to standards/specifications of LTE/LTE-Advanced and/or System Architecture Evolution (SAE). Alternatively, the mobile communication network may be a network conforming to standards/specifications of the fifth generation (5G)/New Radio (NR).

(Management of Terminal Apparatus)

For example, the mobile communication operator A manages correspondence between identification information of the terminal apparatus 600, e.g., an international mobile subscriber identity (IMSI) or the like, and information related to a user using the terminal apparatus 600. Under the management, the terminal apparatus 600 is provided with a mobile communication service using the first mobile communication network 1a, for example. Note that, for example, in a case of congestion of the first mobile communication network 1a or in a case of occurrence of a disaster, the terminal apparatus 600 may be provided with a mobile communication service using both of the first mobile communication network 1a and the second mobile communication network 1b, for example.

For example, the mobile communication operator B manages correspondence between identification information of the terminal apparatus 700, e.g., an IMSI or the like, and information related to a user using the terminal apparatus 700. Under the management, the terminal apparatus 700 is provided with a mobile communication service using both of the first mobile communication network 1a and the second mobile communication network 1b, for example.

3. First Example Embodiment

Next, with reference to FIG. 2 to FIG. 8, a first example embodiment of the present invention will be described.

<3.1. Configuration of Control Apparatus 100>

Figure 2:
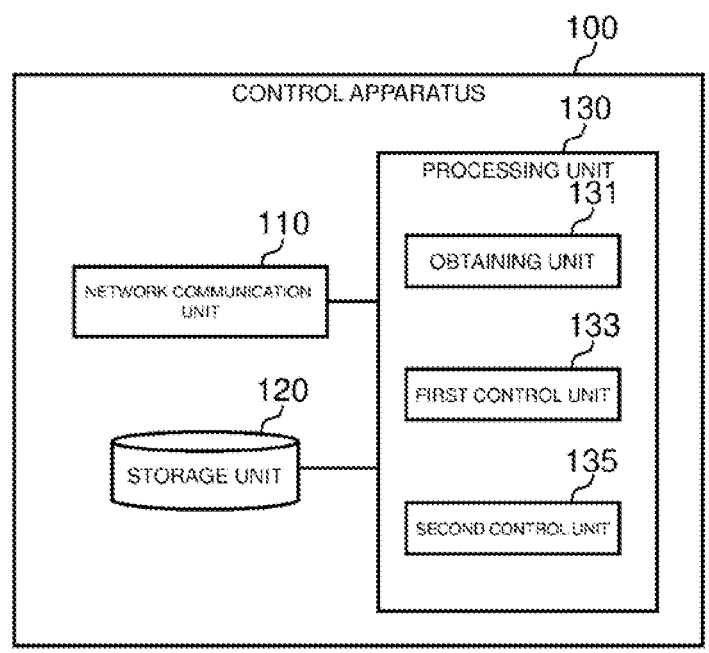
FIG. 2 is a block diagram illustrating an example of a schematic configuration of a control apparatus 100 according to a first example embodiment.

With reference to FIG. 2, an example of a configuration of the control apparatus 100 according to the first example embodiment will be described. FIG. 2 is a block diagram illustrating an example of a schematic configuration of the control apparatus 100 according to the first example embodiment. With reference to FIG. 2, the control apparatus 100 includes a network communication unit 110, a storage unit 120, and a processing unit 130.

(1) Network Communication Unit 110

The network communication unit 110 receives a signal from a network, and transmits a signal to the network.

(2) Storage Unit 120

The storage unit 120 temporarily or permanently stores a program (instructions) and parameters for operations of the control apparatus 100 as well as various data. The program includes one or more instructions for the operations of the control apparatus 100.

(3) Processing Unit 130

The processing unit 130 provides various functions of the control apparatus 100. The processing unit 130 includes an obtaining unit 131, a first control unit 133, and a second control unit 135. Note that the processing unit 130 may further include other constituent elements in addition to these constituent elements. In other words, the processing unit 130 may also perform operations other than the operations of these constituent elements. Specific operations of the obtaining unit 131, the first control unit 133, and the second control unit 135 will be described later in detail.

For example, the processing unit 130 (first control unit 133) performs communication with the core network 20 included in the first mobile communication network 1a via the network communication unit 110. The processing unit 130 (second control unit 135) performs communication with the core network 40 included in the second mobile communication network 1b via the network communication unit 110.

(4) Implementation Example

The network communication unit 110 may be implemented with a network adapter and/or a network interface card, and the like. The storage unit 120 may be implemented with a memory (for example, a nonvolatile memory and/or a volatile memory) and/or a hard disk, and the like. The processing unit 130 may be implemented with one or more processors. The obtaining unit 131, the first control unit 133, and the second control unit 135 may be implemented with the same processor, or may be separately implemented with different processors. The memory (storage unit 120) may be included in the one or more processors, or may be provided outside the one or more processors.

The control apparatus 100 may include a memory that stores a program (instructions), and one or more processors that can execute the program (instructions). The one or more processors may execute the program to thereby perform operations of the processing unit 130 (operations of the obtaining unit 131, the first control unit 133, and/or the second control unit 135). The program may be a program for causing the processor(s) to execute the operations of the processing unit 130 (operations of the obtaining unit 131, the first control unit 133, and/or the second control unit 135).

Note that the control apparatus 100 may be virtualized. In other words, the control apparatus 100 may be implemented as a virtual machine. In this case, the control apparatus 100 (the virtual machine) may operate as a physical machine (hardware) including a processor, a memory, and the like, and a virtual machine on a hypervisor.

<3.2. Configuration of Core Network Node Apparatus 200>

Figure 3:
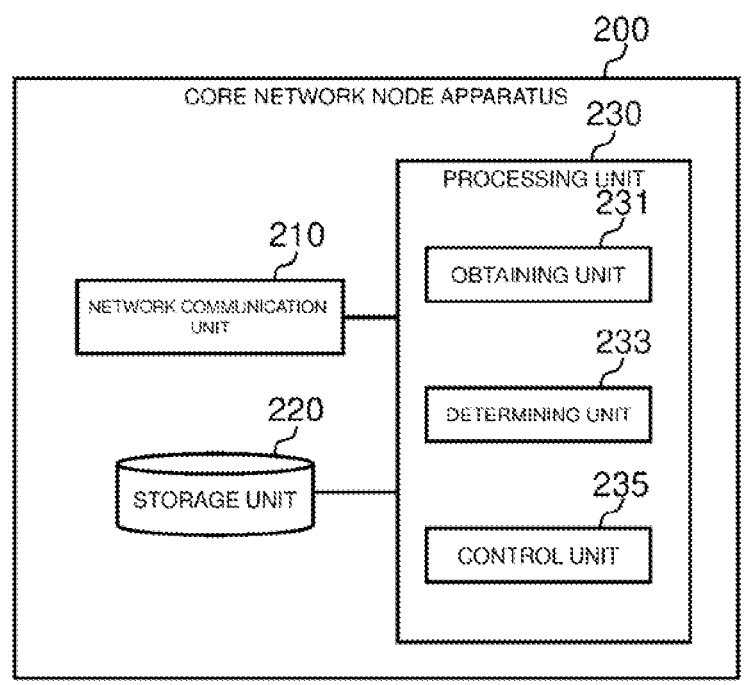
FIG. 3 is a block diagram illustrating an example of a configuration of a core network node apparatus 200 according to the first example embodiment.

Next, with reference to FIG. 3, an example of a configuration of the core network node apparatus 200 according to the first example embodiment will be described. FIG. 3 is a block diagram illustrating an example of a configuration of the core network node apparatus 200 according to the first example embodiment. With reference to FIG. 3, the core network node apparatus 200 includes a network communication unit 210, a storage unit 220, and a processing unit 230.

(1) Network Communication Unit 210

The network communication unit 210 receives a signal from a network, and transmits a signal to the network.

(2) Storage Unit 220

The storage unit 220 temporarily or permanently stores a program (instructions) and parameters for operations of the core network node apparatus 200 as well as various data. The program includes one or more instructions for the operations of the core network node apparatus 200.

(3) Processing Unit 230

The processing unit 230 provides various functions of the core network node apparatus 200. The processing unit 230 includes an obtaining unit 231, a determining unit 233, and a control unit 235. Note that the processing unit 230 may further include other constituent elements in addition to these constituent elements. In other words, the processing unit 230 may also perform operations other than the operations of these constituent elements. Specific operations of the obtaining unit 231, the determining unit 233, and the control unit 235 will be described later in detail.

For example, the processing unit 230 (obtaining unit 231) performs communication with the control apparatus 100 included in the first mobile communication network 1a via the network communication unit 210.

(4) Implementation Example

The network communication unit 210 may be implemented with a network adapter and/or a network interface card, and the like. The storage unit 220 may be implemented with a memory (for example, a nonvolatile memory and/or a volatile memory) and/or a hard disk, and the like. The processing unit 230 may be implemented with one or more processors. The obtaining unit 231, the determining unit 233, and the control unit 235 may be implemented with the same processor, or may be separately implemented with different processors. The memory (storage unit 220) may be included in the one or more processors, or may be provided outside the one or more processors.

The core network node apparatus 200 may include a memory that stores a program (instructions), and one or more processors that can execute the program (instructions). The one or more processors may execute the program to thereby perform operations of the processing unit 230 (operations of the obtaining unit 231, the determining unit 233, and/or the control unit 235). The program may be a program for causing the processor(s) to execute the operations of the processing unit 230 (operations of the obtaining unit 231, the determining unit 233, and/or the control unit 235).

Note that the core network node apparatus 200 may be virtualized. In other words, the core network node apparatus 200 may be implemented as a virtual machine. In this case, the core network node apparatus 200 (the virtual machine) may operate as a physical machine (hardware) including a processor, a memory, and the like, and a virtual machine on a hypervisor.

<3.3. Operation Example>

Next, with reference to FIG. 4 to FIG. 6, operation examples of the first example embodiment will be described.

(1) First Operation Example

First, a first operation example will be described.

According to the first operation example, the control apparatus 100 (first control unit 133) performs control related to the first mobile communication network 1a operated by the mobile communication operator A. The control apparatus 100 (second control unit 135) performs control related to mobility for the terminal apparatus (for example, the terminal apparatus 700b existing in the second mobile communication network 1b) connected to one or more second mobile communication networks (for example, the second mobile communication network 1b) respectively operated by one or more mobile communication operators (for example, the mobile communication operator B) different from the mobile communication operator A via the first mobile communication network 1a.

(1-1) Control Related to First Mobile Communication Network 1a

The control apparatus 100 (first control unit 133) performs control related to mobility for the terminal apparatuses connected to the first mobile communication network 1a. For example, when the core network node apparatus 200a controls mobility for the terminal apparatus 600a, the control apparatus 100 (first control unit 133) controls the core network node apparatus 200a. In this example, the core network node apparatus 200a is a mobility management entity (MME) node.

Note that the control apparatus 100 (first control unit 133) may perform not only the control related to mobility as described above but also control for the core network node (for example, the core network node apparatus 200) that performs charge processing, priority control, band control, and the like for the terminal apparatuses (for example, the terminal apparatuses 600a, 600b, and 700a) connected to the first mobile communication network 1a, for example.

(1-2) Control Related to Second Mobile Communication Network 1b

As described above, the control apparatus 100 (first control unit 133) performs control related to mobility for the terminal apparatus 700b connected to the second mobile communication network 1b via the first mobile communication network 1a.

As an example, when the core network node apparatus 400a controls mobility for the terminal apparatus 700b, the control apparatus 100 (second control unit 135) controls the core network node apparatus 400a. In this example, the core network node apparatus 400a is a mobility management entity (MME) node. In this example, for example, the control apparatus 100 (first control unit 133) may perform communication with the core network node apparatus 400a in the second mobile communication network 1b via the Internet Protocol (IP)-Virtual Private Network (VPN) configured in the first mobile communication network 1a.

Note that the control apparatus 100 (second control unit 135) may perform not only the control related to mobility as described above but also control for the core network node (for example, the core network node apparatus 400) that performs charge processing, priority control, band control, and the like for the terminal apparatus (for example, the terminal apparatus 700b) connected to the second mobile communication network 1b, for example.

(1-3) Radio Frequency Band Used for Mobile Communication Network

Radio communication in the one or more second mobile communication networks (for example, the second mobile communication network 1b) is performed using a radio frequency band used for radio communication in the first mobile communication network 1a.

As a specific example, the mobile communication operator A and the mobile communication operator B have use authority (for example, license regulated by laws on the use of radio waves and the like) to use the same frequency band. In this case, the first mobile communication network 1a and the second mobile communication network 1b respectively operated by the mobile communication operator A and the mobile communication operator B perform communication with the terminal apparatuses connected to the respective mobile communication networks by using the same frequency band.

(1-4) Additional Notes

The one or more second mobile communication networks may include a plurality of second mobile communication networks. In this case, the control apparatus 100 (second control unit 135) may perform control related to mobility for the terminal apparatuses connected to the respective second mobile communication networks.

(2) Second Operation Example

Next, a second operation example will be described.

According to the second operation example, the core network node apparatus 200 (obtaining unit 231) obtains identification information of the terminal apparatuses (for example, the terminal apparatuses 600a, 600b, and 700a) connected to the first mobile communication network 1a. The core network node apparatus 200 (determining unit 233) determines whether the terminal apparatuses (for example, the terminal apparatuses 600a, 600b, and 700a) are managed by the mobile communication operator B, based on the identification information. The core network node apparatus 200 (control unit 235) controls charge processing related to a service provided to the terminal apparatuses (for example, the terminal apparatuses 600a, 600b, and 700a) by the first mobile communication network 1a, based on results of the determination.

(2-1) Obtaining of Identification Information

The identification information of the terminal apparatus is information allowing identification of the terminal apparatus in the first mobile communication network 1a, and is an international mobile subscription identity (IMSI), for example. For example, the core network node apparatus 200 (obtaining unit 231) may access a core network node that registers and stores identification information (for example, an IMSI) of the terminal apparatus in the core network 20, for example, and thereby obtain the identification information. The core network node that registers and stores the identification information of the terminal apparatus is, for example, a Home Location Register (HLR) and/or a Home Subscriber Server (HSS), or the like.

For example, the core network node apparatus 200 (determining unit 233) can identify the mobile communication operator that manages the terminal apparatus associated with the IMSI, based on an operator identification code or the like included in the IMSI.

(2-2) Control Related to Charge Processing

First Specific Example

First, according to the first specific example, when it is determined that the terminal apparatus (for example, the terminal apparatus 700a) is managed by the mobile communication operator B, the core network node apparatus 200 (control unit 235) performs control for reducing a communication fee relating to the terminal apparatus (for example, the terminal apparatus 700a) to be lower than a communication fee relating to the terminal apparatuses (for example, the terminal apparatuses 600a and 600b) managed by the first mobile communication network 1a.

FIG. 4 is an explanatory diagram for describing an example of charge processing for reducing the communication fee. With reference to FIG. 4, for example, when it is determined that the terminal apparatuses (for example, the terminal apparatuses 600a and 600b) are managed by the mobile communication operator A, the core network node apparatus 200 (control unit 235) does not increase or reduce the communication fee. For example, when the communication fee is set to 20 yen per minute, the terminal apparatuses 600a and 600b are charged 20 yen per minute as the communication fee.

In contrast, for example, when it is determined that the terminal apparatus (for example, the terminal apparatus 700a) is managed by the mobile communication operator B, the core network node apparatus 200 (control unit 235) performs control for reducing the communication fee charged per minute by 10 yen, for example.

Second Specific Example

For example, not only the above-described processing of reducing the communication fee as in the first specific example, but also control related to charging as in the second specific example may be performed, for example.

According to the second specific example, when it is determined that the terminal apparatus (for example, the terminal apparatus 700a) is managed by the mobile communication operator B, the core network node apparatus 200 (control unit 235) performs control for not charging the terminal apparatus (for example, the terminal apparatus 700a) the communication fee.

(2-3) Radio Frequency Band Used for Mobile Communication Network

Similarly to the first operation example described above, radio communication in the second mobile communication network 1b managed by the mobile communication operator B is performed using a radio frequency band used for radio communication in the first mobile communication network 1a.

As a specific example, the mobile communication operator A and the mobile communication operator B have use authority (for example, license regulated by laws on the use of radio waves and the like) to use the same frequency band. In this case, the first mobile communication network 1a and the second mobile communication network 1b respectively operated by the mobile communication operator A and the mobile communication operator B perform communication with the terminal apparatuses connected to the respective mobile communication networks by using the same frequency band.

(2-4) Flow of Processing

Next, with reference to FIG. 5, a flow of processing according to the second operation example will be described. FIG. 5 is a flowchart for describing a flow of processing according to the second operation example.

Figure 5:
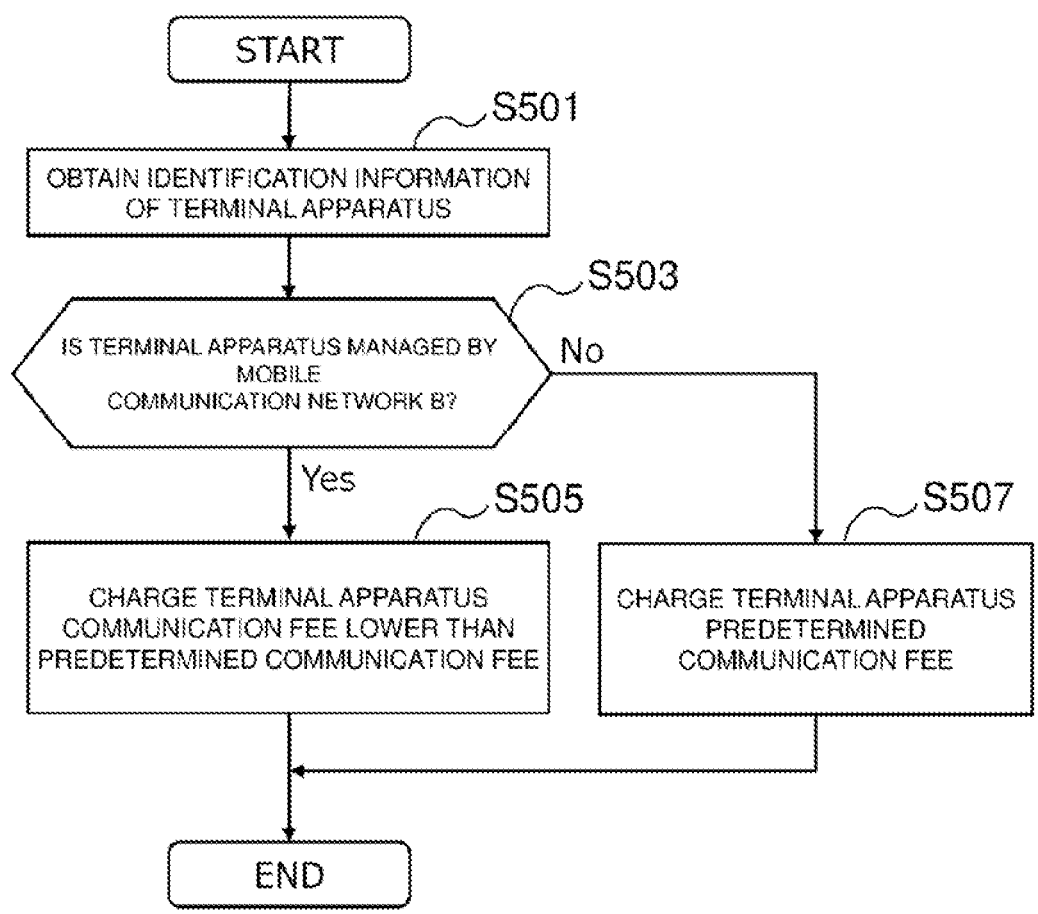
FIG. 5 is a flowchart for describing a flow of processing according to a second operation example.

With reference to FIG. 5, first, the core network node apparatus 200 (obtaining unit 231) obtains identification information of the terminal apparatuses (for example, the terminal apparatuses 600a, 600b, and 700a) connected to the first mobile communication network 1a (Step S501). Next, the core network node apparatus 200 (determining unit 233) determines whether the terminal apparatuses (for example, the terminal apparatuses 600a, 600b, and 700a) are managed by the mobile communication operator B, based on the identification information (Step S503).

When the terminal apparatus (for example, the terminal apparatus 700a) is managed by the mobile communication operator B (S503: Yes), the core network node apparatus 200 (control unit 235) performs control for charging the terminal apparatus (for example, the terminal apparatus 700a) a communication fee lower than a predetermined communication fee (for example, 20 yen per minute in the example of FIG. 4) (Step S505), and then terminates the processing illustrated in FIG. 5.

In contrast, when the terminal apparatuses (for example, the terminal apparatuses 600a and 600b) are not managed by the mobile communication operator B (S503: No), the core network node apparatus 200 (control unit 235) performs control for charging the terminal apparatuses (for example, the terminal apparatuses 600a and 600b) the predetermined communication fee (for example, 20 yen per minute in the example of FIG. 4) (Step S507), and then terminates the processing illustrated in FIG. 5.

According to the processing illustrated in FIG. 5 above, the terminal apparatus (for example, the terminal apparatus 700a) under management of the mobile communication operator B managing the second mobile communication network 1b can be preferentially treated regarding charging related to the communication service in the first mobile communication network 1a.

(3) Third Operation Example

Next, a third operation example will be described.

According to the third operation example, the core network node apparatus 200 (obtaining unit 231) obtains identification information of the terminal apparatuses (for example, the terminal apparatuses 600a, 600b, and 700a) connected to the first mobile communication network 1a. The core network node apparatus 200 (determining unit 233) determines whether the terminal apparatuses (for example, the terminal apparatuses 600a, 600b, and 700a) are managed by the mobile communication operator B, based on the identification information. The core network node apparatus 200 (control unit 235) controls communication quality related to a service provided to the terminal apparatuses (for example, the terminal apparatuses 600a, 600b, and 700a) by the first mobile communication network 1a, based on results of the determination.

(3-1) Obtaining of Identification Information

The identification information of the terminal apparatus is information allowing identification of the terminal apparatus in the mobile communication network, and is an IMSI, for example. For example, the core network node apparatus 200 (obtaining unit 231) may access a core network node that registers and stores identification information (for example, an IMSI) of the terminal apparatus in the core network 20, and thereby obtain the identification information. The core network node that manages the identification information of the terminal apparatus is, for example, an HLR and/or an HSS, or the like.

For example, the core network node apparatus 200 (determining unit 233) can identify the mobile communication operator that manages the terminal apparatus associated with the IMSI, based on an operator identification code or the like included in the IMSI.

(3-2) Control Related to Communication Quality

When it is determined that the terminal apparatus (for example, the terminal apparatus 700a) is managed by the mobile communication operator B, the core network node apparatus 200 (control unit 235) performs control for enhancing communication quality for the terminal apparatus (for example, the terminal apparatus 700a) to be higher than communication quality for the terminal apparatuses (for example, the terminal apparatuses 600a and 600b) managed by the first mobile communication network 1a.

Priority Control

For example, the control performed by the core network node apparatus 200 (control unit 235) includes priority control for raising order of priority of packets used for the terminal apparatus 700a to be higher than order of priority of packets used for the terminal apparatuses 600a and 600b managed by the first mobile communication network 1a.

Band Control

For example, the control performed by the core network node apparatus 200 (control unit 235) includes band control for restricting a communication band used for the terminal apparatuses 600a and 600b managed by the first mobile communication network 1a to a predetermined bandwidth or lower.

(3-3) Radio Frequency Band Used for Mobile Communication Network

Similarly to the first and second operation examples described above, radio communication in the second mobile communication network 1b managed by the mobile communication operator B is performed using a radio frequency band used for radio communication in the first mobile communication network 1a.

As a specific example, the mobile communication operator A and the mobile communication operator B have use authority (for example, license regulated by laws on the use of radio waves and the like) to use the same frequency band. In this case, the first mobile communication network 1a and the second mobile communication network 1b respectively managed by the mobile communication operator A and the mobile communication operator B perform communication with the terminal apparatuses connected to the respective mobile communication networks by using the same frequency band.

(3-4) Flow of Processing

Next, with reference to FIG. 6, a flow of processing according to the third operation example will be described. FIG. 6 is a flowchart for describing a flow of processing according to the third operation example.

Figure 6:
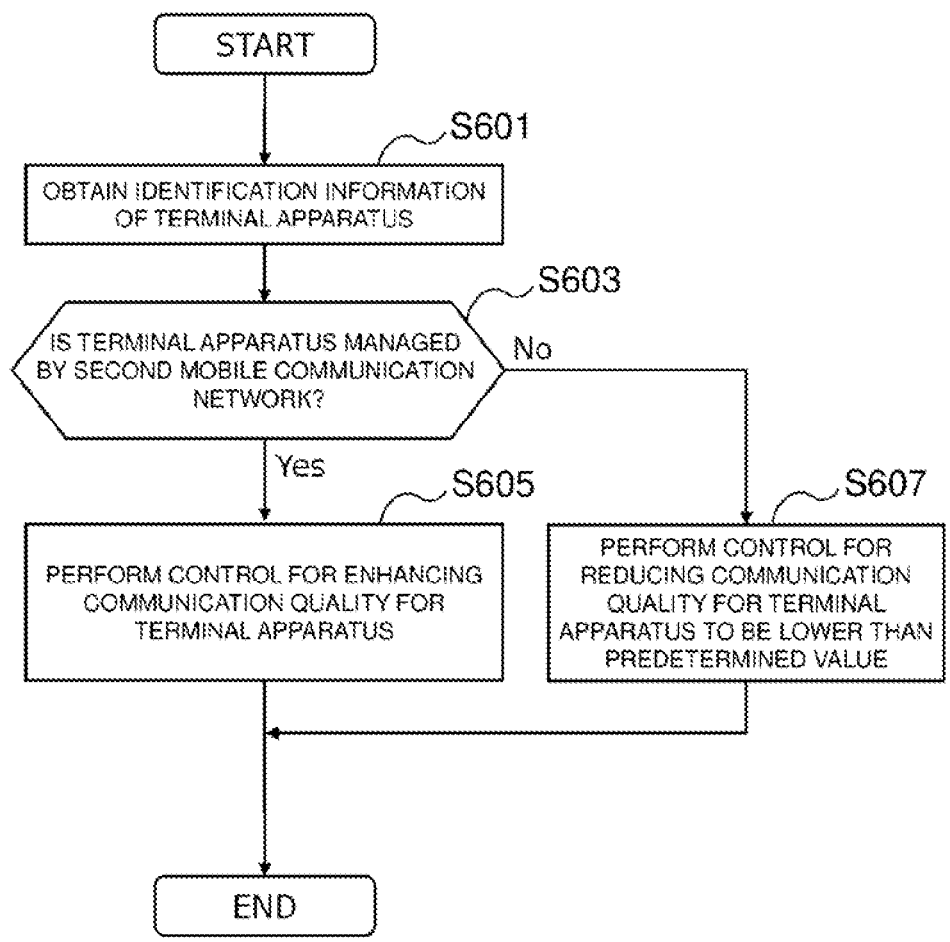
FIG. 6 is a flowchart for describing a flow of processing according to a third operation example.

With reference to FIG. 6, first, the core network node apparatus 200 (for example, the obtaining unit 231) obtains identification information of the terminal apparatuses (for example, the terminal apparatuses 600a, 600b, and 700a) connected to the first mobile communication network 1a (Step S601). Next, the core network node apparatus 200 (determining unit 233) determines whether the terminal apparatuses (for example, the terminal apparatuses 600a, 600b, and 700a) are managed by the mobile communication operator B, based on the identification information (Step S603).

When the terminal apparatus (for example, the terminal apparatus 700a) is managed by the mobile communication operator B (S503: Yes), the core network node apparatus 200

(control unit 235) performs control for enhancing communication quality for the terminal apparatus (for example, the terminal apparatus 700a) to be higher than communication quality for the terminal apparatuses (for example, the terminal apparatuses 600a and 600b) managed by the first mobile communication network 1a.

Specifically, the core network node apparatus 200 (control unit 235) performs priority control for raising order of priority of packets used for the terminal apparatus 700a to be higher than order of priority of packets used for the terminal apparatuses 600a and 600b managed by the first mobile communication network 1a. The core network node apparatus 200 (control unit 235) performs band control for restricting a communication band used for the terminal apparatuses 600a and 600b managed by the first mobile communication network 1a to a predetermined bandwidth or lower. Then, the processing illustrated in FIG. 6 terminates.

In contrast, when the terminal apparatuses (for example, the terminal apparatuses 600a and 600b) are not managed by the mobile communication operator B (S603: No), the core network node apparatus 200 (control unit 235) performs control for reducing communication quality of the terminal apparatuses (for example, the terminal apparatuses 600a and 600b) to be lower than a predetermined value.

Specifically, the core network node apparatus 200 (control unit 235) performs band control for restricting the communication band used for the terminal apparatuses 600a and 600b managed by the first mobile communication network 1a to the predetermined bandwidth or lower. Then, the processing illustrated in FIG. 6 terminates.

According to the processing illustrated in FIG. 6 above, the terminal apparatus (for example, the terminal apparatus 700a) under management of the mobile communication operator B managing the second mobile communication network 1b can be preferentially treated, and communication processing can be preferentially performed in the first mobile communication network 1a.

In addition, the processing illustrated in FIG. 6 above may be performed only when the first mobile communication network 1a is in a congestion state or when a disaster occurs in a coverage area of the first mobile communication network 1a, for example. As an example, in case of the congestion state or occurrence of a disaster, communication of the terminal apparatus (for example, the terminal apparatus 700a) under management of the mobile communication operator B may be prioritized, and control such as band restriction may be imposed on communication of the terminal apparatuses (for example, the terminal apparatuses 600a and 600b) under management of the mobile communication operator A.

<3.4. Example Alteration>

The first example embodiment can be altered in various ways in addition to the configuration of the system 1 illustrated in FIG. 1, for example.

Figure 7:
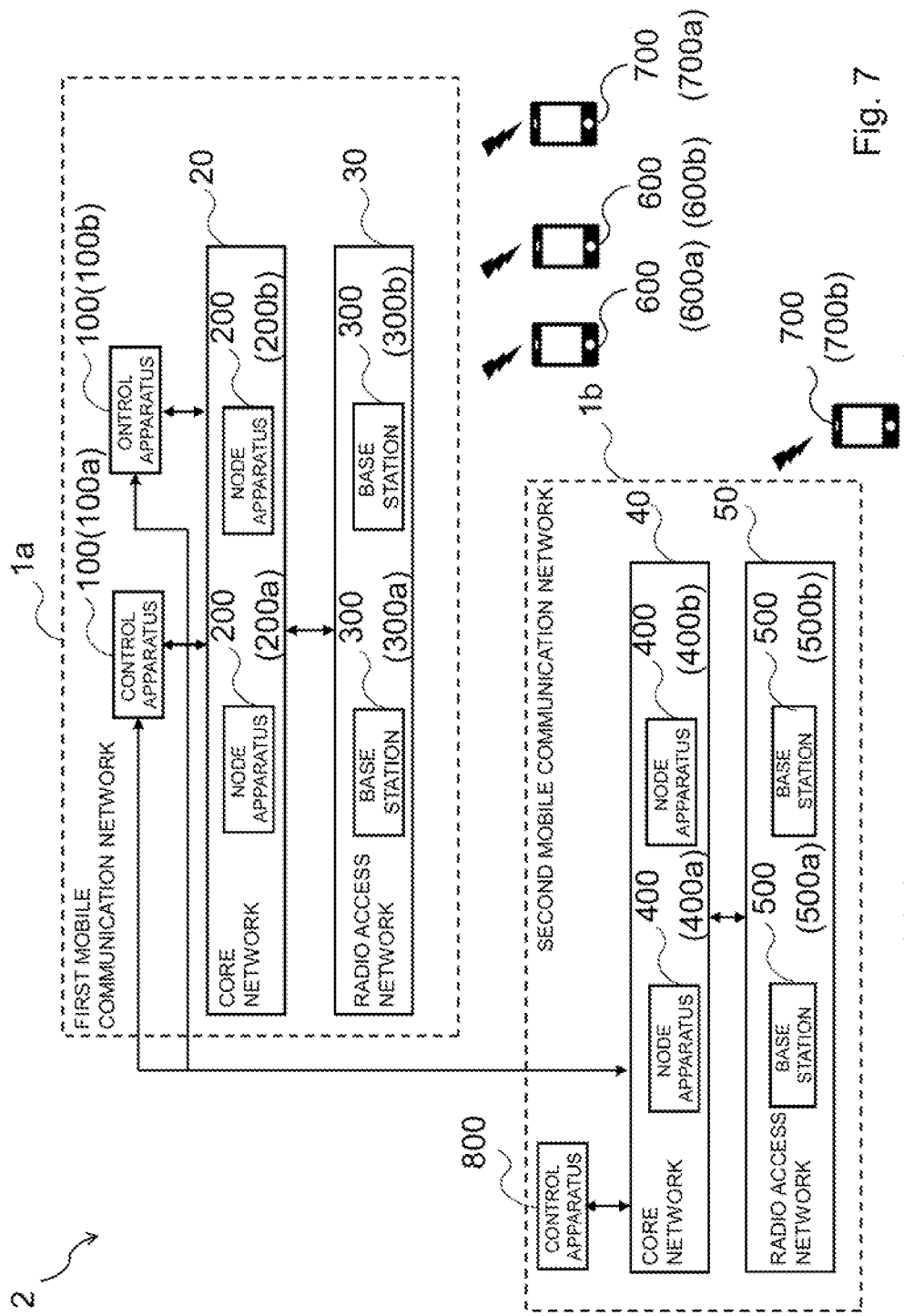
FIG. 7 is an explanatory diagram illustrating an example of a schematic configuration of a system 2 according to an example alteration of the first example embodiment.

For example, with reference to FIG. 7, an example of a configuration of a system 2 according to an example alteration will be described. FIG. 7 is an explanatory diagram illustrating an example of a schematic configuration of the system 2 according to an example alteration of the first example embodiment. With reference to FIG. 7, the system 2 is different from the configuration of the system 1 as illustrated in FIG. 1 described above in that the second mobile communication network 1b includes a control apparatus 800. In other words, the system 2 includes the control apparatus 800 allowing the mobile communication operator B to independently perform control related to the second mobile communication network 1b.

(1) Configuration of Control Apparatus 800

Figure 8:
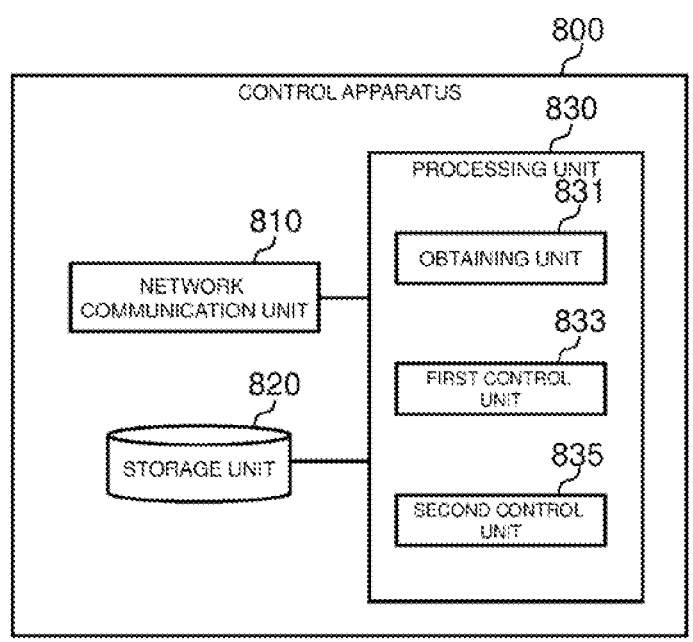
FIG. 8 is a block diagram illustrating an example of a schematic configuration of a control apparatus 800 according to the example alteration of the first example embodiment.

With reference to FIG. 8, an example of a configuration of the control apparatus 800 according to the example alteration of the first example embodiment will be described. FIG. 8 is a block diagram illustrating an example of a schematic configuration of the control apparatus 800 according to the example alteration of the first example embodiment. With reference to FIG. 8, the control apparatus 800 includes a network communication unit 810, a storage unit 820, and a processing unit 830.

Network Communication Unit 810

The network communication unit 810 receives a signal from a network, and transmits a signal to the network.

Storage Unit 820

The storage unit 820 temporarily or permanently stores a program (instructions) and parameters for operations of the control apparatus 800 as well as various data. The program includes one or more instructions for the operations of the control apparatus 800.

Processing Unit 830

The processing unit 830 provides various functions of the control apparatus 800. The processing unit 830 includes an obtaining unit 831, a first control unit 833, and a second control unit 835. Note that the processing unit 830 may further include other constituent elements in addition to these constituent elements. In other words, the processing unit 830 may also perform operations other than the operations of these constituent elements. Specific operations of the obtaining unit 831, the first control unit 833, and the second control unit 835 will be described later in detail.

For example, the processing unit 830 (first control unit 833) performs communication with the core network 40 included in the second mobile communication network 1b via the network communication unit 810.

Implementation Example

The network communication unit 810 may be implemented with a network adapter and/or a network interface card, and the like. The storage unit 820 may be implemented with a memory (for example, a nonvolatile memory and/or a volatile memory) and/or a hard disk, and the like. The processing unit 830 may be implemented with one or more processors. The obtaining unit 831, the first control unit 833, and the second control unit 835 may be implemented with the same processor, or may be separately implemented with different processors. The memory (storage unit 820) may be included in the one or more processors, or may be provided outside the one or more processors.

The control apparatus 800 may include a memory that stores a program (instructions), and one or more processors that can execute the program (instructions). The one or more processors may execute the program to thereby perform operations of the processing unit 830 (operations of the obtaining unit 831, the first control unit 833, and/or the second control unit 835). The program may be a program for causing the processor(s) to execute the operations of the processing unit 830 (operations of the obtaining unit 831, the first control unit 833, and/or the second control unit 835).

Note that the control apparatus 800 may be virtualized. In other words, the control apparatus 800 may be implemented as a virtual machine. In this case, the control apparatus 800 (the virtual machine) may operate as a physical machine (hardware) including a processor, a memory, and the like, and a virtual machine on a hypervisor.

(2) Operation Example

Next, an operation example according to the example alteration will be described.

According to the operation example of the example alteration, the control apparatus 100 (second control unit 135) included in the first mobile communication network 1a performs control related to mobility for the terminal apparatus (for example, the terminal apparatus 700b) connected to the second mobile communication network 1b for the second mobile communication network 1b via the first mobile communication network 1a.

According to the operation example of the example alteration, the control apparatus 800 (first control unit 833) included in the second mobile communication network 1b performs control related to mobility for the terminal apparatus (for example, the terminal apparatus 700b) connected to the second mobile communication network 1b for the second mobile communication network 1b not via another mobile communication network (for example, the first mobile communication network 1a) different from the second mobile communication network 1b.

Obtaining of Terminal Information

The control apparatus 800 (obtaining unit 831) included in the second mobile communication network 1b obtains terminal information related to the terminal apparatuses (for example, the terminal apparatuses 600a, 600b, and 700a) connected to the first mobile communication network 1a from the control apparatus 100 included in the first mobile communication network 1a.

Specifically, the terminal information includes, for example, identification information such as an IMSI, information related to connection between each of the terminal apparatuses and each of the network nodes in the first mobile communication network 1a, and the like.

The control apparatus 800 (obtaining unit 831) included in the second mobile communication network 1b may obtain the terminal information according to resources (for example, a data processing amount per unit time or the like) of the control apparatus 100 included in the first mobile communication network 1a. For example, only when the resources (for example, the data processing amount per unit time) of the control apparatus 100 falls below a predetermined threshold (for example, a predetermined data processing amount) because the first mobile communication network 1a is in the congestion state, the control apparatus 800 (obtaining unit 831) included in the second mobile communication network 1b may obtain the terminal information.

With the control apparatus 800 (obtaining unit 831) included in the second mobile communication network 1b obtaining such terminal information, the control apparatus 800 can perform control related to mobility and control related to communication quality to be specifically described below.

Control Related to Mobility

For example, only when the first mobile communication network 1a is in the congestion state or a disaster occurs in a service area of the first mobile communication network 1a, the control apparatus 800 (first control unit 833) included in the second mobile communication network 1b may perform control related to mobility for the terminal apparatus (for example, the terminal apparatus 700b) connected to the second mobile communication network 1b.

In other words, in a normal case, control related to mobility for the terminal apparatus (for example, the terminal apparatus 700b) connected to the second mobile communication network 1b may be performed by the control apparatus 100 included in the first mobile communication network 1a. With this, the control apparatus 800 included in the second mobile communication network 1b can be used as a backup function that complements the role of the control apparatus 100 included in the first mobile communication network 1a.

Control Related to Communication Quality

The control apparatus 800 (second control unit 835) included in the second mobile communication network 1b may perform control related to communication quality for enhancing communication quality of the terminal apparatuses (for example, the terminal apparatuses 700a and 700b) managed by the mobile communication operator B to be higher than communication quality of the terminal apparatuses (for example, the terminal apparatuses 600a and 600b) managed by the mobile communication operator A.

Specifically, the control related to the communication quality includes priority control for raising order of priority of packets used for the terminal apparatuses (for example, the terminal apparatuses 700a and 700b) managed by the mobile communication operator B to be higher than order of priority of packets used for the terminal apparatuses (for example, the terminal apparatuses 600a and 600b) managed by the mobile communication operator A.

The control related to the communication quality includes band control for restricting a communication band used for the terminal apparatuses (for example, the terminal apparatuses 600a and 600b) managed by the first mobile communication network 1a to a predetermined bandwidth or lower.

As a specific example, when the first mobile communication network 1a is in the congestion state, the control apparatus 800 (second control unit 835) included in the second mobile communication network 1b may perform control related to communication quality of the terminal apparatuses (for example, the terminal apparatuses 600a, 600b, and 700b) connected to the first mobile communication network 1a, in place of the control apparatus 100 included in the first mobile communication network 1a.

In this example, the control apparatus 800 (second control unit 835) included in the second mobile communication network 1b performs priority control for raising order of priority of packets used for the terminal apparatus 700a to be higher than order of priority of packets used for the terminal apparatuses 600a and 600b managed by the first mobile communication network 1a. The control apparatus 800 (second control unit 835) included in the second mobile communication network 1b performs band control for restricting a communication band used for the terminal apparatuses 600a and 600b managed by the first mobile communication network 1a to a predetermined bandwidth or lower.

Priority of Access to Each Control Apparatus

For example, with the base station 300 in the radio access network 30 included in the first mobile communication network 1a carrying out access in the following order of priority, for example, operation of the base station 300 may be controlled. In this case, the first priority of the base station 300 is to access the control apparatus 100 included in the first mobile communication network 1a, and the second priority, lower than the first priority, thereof is to access the control apparatus 800 included in the second mobile communication network 1b. With the base station 300 accessing each of the control apparatuses 100 and 800 according to such priority, appropriate control can be performed even when there are a plurality of control apparatuses (for example, the control apparatuses 100a, 100b, and 800).

With the base station 500 in the radio access network 50 included in the second mobile communication network 1b carrying out access in the following order of priority, for example, operation of the base station 500 may be controlled. In other words, the first priority of the base station 500 is to access the control apparatus 800 included in the second mobile communication network 1b, and the second priority, lower than the first priority, thereof is to access the control apparatus 100 included in the first mobile communication network 1a. With the base station 500 accessing each of the control apparatuses 100 and 800 according to such priority, appropriate control can be performed even when there are a plurality of control apparatuses (for example, the control apparatuses 100a, 100b, and 800).

4. Second Example Embodiment

Next, with reference to FIG. 9, a second example embodiment of the present invention will be described. While the first example embodiment described above is a specific example embodiment, the second example embodiment is a more generalized example embodiment.

<4.1. Configuration of Control Apparatus 150>

Figure 9:
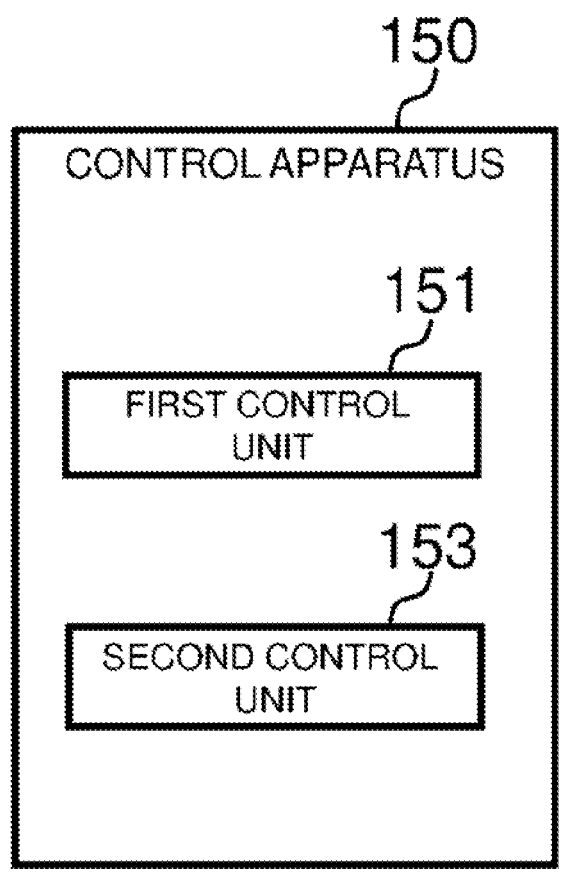
FIG. 9 is a block diagram illustrating an example of a schematic configuration of a control apparatus 150 according to a second example embodiment.

FIG. 9 is a block diagram illustrating an example of a schematic configuration of a control apparatus 150 according to the second example embodiment. With reference to FIG. 9, the control apparatus 150 includes a first control unit 151 and a second control unit 153. Specific operations of the first control unit 151 and the second control unit 153 will be described later.

The first control unit 151 and the second control unit 153 may be implemented with one or more processors, and a memory (for example, a nonvolatile memory and/or a volatile memory) and/or a hard disk. The first control unit 151 and the second control unit 153 may be implemented with the same processor, or may be separately implemented with different processors. The memory may be included in the one or more processors, or may be provided outside the one or more processors.

The control apparatus 150 may include a memory that stores a program (instructions), and one or more processors that can execute the program (instructions). The one or more processors may execute the program to thereby perform operations of the first control unit 151 and the second control unit 153. The program may be a program for causing the processor(s) to execute the operations of the first control unit 151 and the second control unit 153.

<4.2. Operation Example>

An operation example according to the second example embodiment will be described.

According to the second example embodiment, the control apparatus 150 (first control unit 151) performs control related to the first mobile communication network operated by the first mobile communication operator. The control apparatus 150 (second control unit 153) performs control related to mobility for the terminal apparatus connected to one or more second mobile communication networks respectively operated by one or more second mobile communication operators different from the first mobile communication operator via the first mobile communication network.

Relationship with First Example Embodiment

As an example, the control apparatus 150 according to the second example embodiment is the control apparatus 100 according to the first example embodiment. In this case, description regarding the first example embodiment may also be applied to the second example embodiment.

Note that the second example embodiment is not limited to this example.

The second example embodiment has been described above. According to the second example embodiment, in the mobile communication system including a plurality of mobile communication networks respectively operated by a plurality of mobile communication operators, cooperation can be appropriately performed among the respective mobile communication networks.

5. Third Example Embodiment

Next, with reference to FIG. 10, a third example embodiment of the present invention will be described. While the first example embodiment described above is a specific example embodiment, the third example embodiment is a more generalized example embodiment.

<5.1. Configuration of Core Network Node Apparatus 250>

Figure 10:
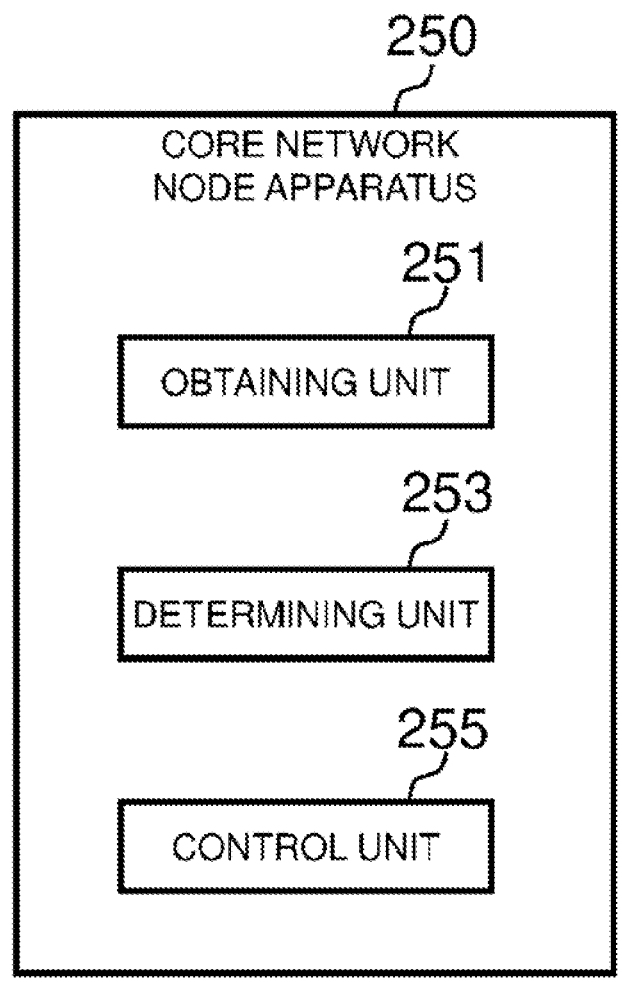
FIG. 10 is a block diagram illustrating an example of a schematic configuration of a core network node apparatus 250 according to a third example embodiment.

FIG. 10 is a block diagram illustrating an example of a schematic configuration of a core network node apparatus 250 according to the third example embodiment. With reference to FIG. 10, the core network node apparatus 250 includes an obtaining unit 251, a determining unit 253, and a control unit 255. Specific operations of the obtaining unit 251, the determining unit 253, and the control unit 255 will be described later.

The obtaining unit 251, the determining unit 253, and the control unit 255 may be implemented with one or more processors, and a memory (for example, a nonvolatile memory and/or a volatile memory) and/or a hard disk. The obtaining unit 251, the determining unit 253, and the control unit 255 may be implemented with the same processor, or may be separately implemented with different processors. The memory may be included in the one or more processors, or may be provided outside the one or more processors.

The core network node apparatus 250 may include a memory that stores a program (instructions), and one or more processors that can execute the program (instructions). The one or more processors may execute the program to thereby perform operations of the obtaining unit 251, the determining unit 253, and the control unit 255. The program may be a program for causing the processor(s) to execute the operations of the obtaining unit 251, the determining unit 253, and the control unit 255.

<5.2. Operation Example>

An operation example according to the third example embodiment will be described.

According to the third example embodiment, the core network node apparatus 250 is a node apparatus in the first mobile communication network operated by the first mobile communication operator. The core network node apparatus 250 (obtaining unit 251) obtains identification information of the terminal apparatus connected to the first mobile communication network. The core network node apparatus 250 (determining unit 253) determines whether the terminal apparatus is managed by the second mobile communication operator operating the second mobile communication network different from the first mobile communication network, based on the identification information. The core network node apparatus 250 (control unit 255) controls charge processing related to a service provided to the terminal apparatus by the first mobile communication network, based on results of the determination.

Relationship with First Example Embodiment

As an example, the core network node apparatus 250 according to the third example embodiment is the core network node apparatus 200 according to the first example embodiment. In this case, description regarding the first example embodiment may also be applied to the second example embodiment.

Note that the third example embodiment is not limited to this example.

The third example embodiment has been described above. According to the third example embodiment, in the mobile communication system including a plurality of mobile communication networks respectively operated by a plurality of mobile communication operators, cooperation can be appropriately performed among the respective mobile communication networks.

6. Fourth Example Embodiment

Next, with reference to FIG. 11, a fourth example embodiment of the present invention will be described. While the first example embodiment described above is a specific example embodiment, the fourth example embodiment is a more generalized example embodiment.

<6.1. Configuration of Core Network Node Apparatus 270>

Figure 11:
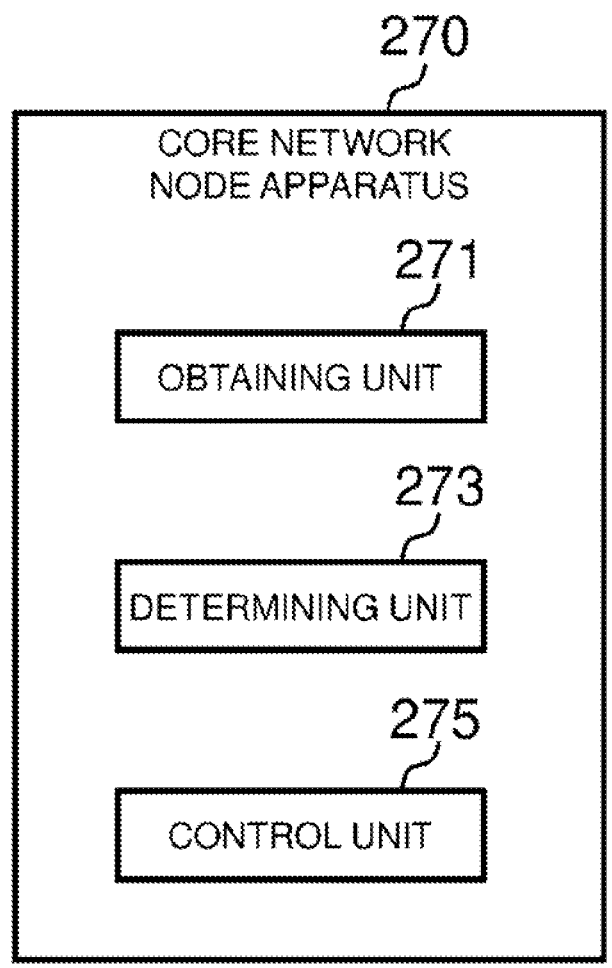
FIG. 11 is a block diagram illustrating an example of a schematic configuration of a core network node apparatus 270 according to a fourth example embodiment.

FIG. 11 is a block diagram illustrating an example of a schematic configuration of a core network node apparatus 270 according to the fourth example embodiment. With reference to FIG. 11, the core network node apparatus 270 includes an obtaining unit 271, a determining unit 273, and a control unit 275. Specific operations of the obtaining unit 271, the determining unit 273, and the control unit 275 will be described later.

The obtaining unit 271, the determining unit 273, and the control unit 275 may be implemented with one or more processors, and a memory (for example, a nonvolatile memory and/or a volatile memory) and/or a hard disk. The obtaining unit 271, the determining unit 273, and the control unit 275 may be implemented with the same processor, or may be separately implemented with different processors. The memory may be included in the one or more processors, or may be provided outside the one or more processors.

The core network node apparatus 270 may include a memory that stores a program (instructions), and one or more processors that can execute the program (instructions). The one or more processors may execute the program to thereby and perform operations of the obtaining unit 271, the determining unit 273, and the control unit 275. The program may be a program for causing the processor(s) to execute the operations of the obtaining unit 271, the determining unit 273, and the control unit 275.

<6.2. Operation Example>

An operation example according to the fourth example embodiment will be described.

According to the fourth example embodiment, the core network node apparatus 270 is a node apparatus in the first mobile communication network operated by the first mobile communication operator. The core network node apparatus 270 (obtaining unit 271) obtains identification information of the terminal apparatus connected to the first mobile communication network. The core network node apparatus 270 (determining unit 273) determines whether the terminal apparatus is managed by the second mobile communication operator operating the second mobile communication network different from the first mobile communication network, based on the identification information. The core network node apparatus 270 (control unit 275) controls communication quality related to a service provided to the terminal apparatus by the first mobile communication network, based on results of the determination.

Relationship with First Example Embodiment

As an example, the core network node apparatus 270 according to the fourth example embodiment is the core network node apparatus 200 according to the first example embodiment. In this case, description regarding the first example embodiment may also be applied to the fourth example embodiment.

Note that the fourth example embodiment is not limited to this example.

The fourth example embodiment has been described above. According to the fourth example embodiment, in the mobile communication system including a plurality of mobile communication networks respectively operated by a plurality of mobile communication operators, cooperation can be appropriately performed among the respective mobile communication networks.

7. Fifth Example Embodiment

Next, with reference to FIG. 12, a fifth example embodiment of the present invention will be described. While the first example embodiment described above is a specific example embodiment, the fifth example embodiment is a more generalized example embodiment.

<7.1. Configuration of Mobile Communication System 3>

Figure 12:
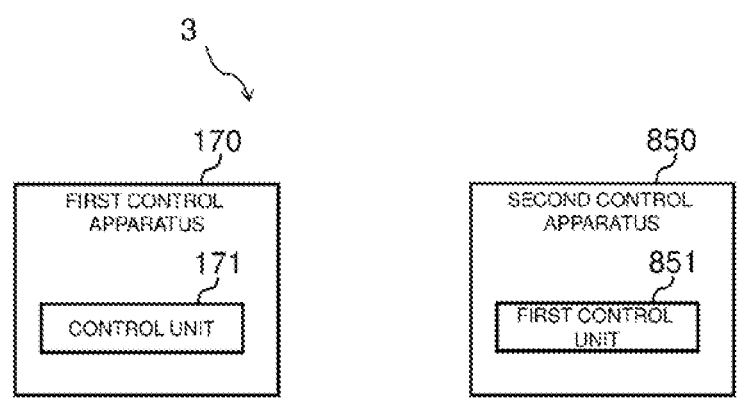
FIG. 12 is a block diagram illustrating an example of a schematic configuration of a mobile communication system 3 according to a fifth example embodiment.

FIG. 12 is a block diagram illustrating an example of a schematic configuration of a mobile communication system 3 according to the fifth example embodiment. With reference to FIG. 12, the mobile communication system 3 includes a first control apparatus 170 and a second control apparatus 850.

<7.2. Configuration of First Control Apparatus 170>

The first control apparatus 170 includes a control unit 171. Specific operations of the control unit 171 will be described later.

The control unit 171 may be implemented with one or more processors, and a memory (for example, a nonvolatile memory and/or a volatile memory) and/or a hard disk. The memory may be included in the one or more processors, or may be provided outside the one or more processors.

The first control apparatus 170 may include a memory that stores a program (instructions), and one or more processors that can execute the program (instructions). The one or more processors may execute the program to thereby perform operations of the control unit 171. The program may be a program for causing the processor(s) to execute the operations of the control unit 171.

<7.3. Configuration of Second Control Apparatus 850>

The second control apparatus 850 includes a first control unit 851. Specific operations of the first control unit 851 will be described later.

The first control unit 851 may be implemented with one or more processors, and a memory (for example, a nonvolatile memory and/or a volatile memory) and/or a hard disk. The memory may be included in the one or more processors, or may be provided outside the one or more processors.

The second control apparatus 850 may include a memory that stores a program (instructions), and one or more processors that can execute the program (instructions). The one or more processors may execute the program to thereby perform operations of the first control unit 851. The program may be a program for causing the processor(s) to execute the operations of the first control unit 851.

<7.4. Operation Example>

An operation example according to the fifth example embodiment will be described.

According to the fifth example embodiment, the first control apparatus 170 (control unit 171) performs control related to mobility for the terminal apparatus connected to the second mobile communication network for the second mobile communication network operated by the second mobile communication operator different from the first mobile communication operator via the first mobile communication network operated by the first mobile communication operator.

The second control apparatus 850 (first control unit 851) performs control related to mobility for the terminal apparatus connected to the second mobile communication network for the second mobile communication network not via another mobile communication network different from the second mobile communication network.

Relationship with First Example Embodiment

As an example, the control unit 171 included in the first control apparatus 170 according to the fourth example embodiment is the second control unit 135 included in the control apparatus 100 according to the first example embodiment. The first control unit 851 included in the second control apparatus 850 according to the fourth example embodiment is the first control unit 833 included in the control apparatus 800 according to the first example embodiment. In this case, description regarding the first example embodiment may also be applied to the fifth example embodiment.

Note that the fifth example embodiment is not limited to this example.

The fifth example embodiment has been described above. According to the fifth example embodiment, in the mobile communication system including a plurality of mobile communication networks respectively operated by a plurality of mobile communication operators, cooperation can be appropriately performed among the respective mobile communication networks.

8. Other Example Embodiments

Descriptions have been given above of the example embodiments of the present invention. However, the present invention is not limited to these example embodiments. It should be understood by those of ordinary skill in the art that these example embodiments are merely examples and that various alterations are possible without departing from the scope and the spirit of the present invention.

For example, the steps in the processing described in the Specification may not necessarily be executed in time series in the order described in the corresponding sequence diagram. For example, the steps in the processing may be executed in an order different from that described in the corresponding sequence diagram or may be executed in parallel. Some of the steps in the processing may be deleted, or more steps may be added to the processing.

An apparatus including constituent elements of the control apparatus described in the Specification (e.g., one or more apparatuses (or units) among a plurality of apparatuses (or units) constituting the control apparatus or a module for one of the plurality of apparatuses (or units)) may be provided. An apparatus including constituent elements of the core network node apparatus described in the Specification (e.g., one or more apparatuses (or units) among a plurality of apparatuses (or units) constituting the core network node apparatus or a module for one of the plurality of apparatuses (or units)) may be provided. Moreover, methods including processing of the constituent elements may be provided, and programs for causing a processor to execute processing of the constituent elements may be provided. Moreover, non-transitory computer readable recording media (non-transitory computer readable media) having recorded thereon the programs may be provided. It is apparent that such apparatuses, modules, methods, programs, and non-transitory computer readable recording media are also included in the present invention.

9. Supplementary Notes

The whole or part of the example embodiments disclosed above can be described as, but not limited to, the following supplementary notes.

<9.1. First Set of Supplementary Notes>

(Supplementary Note 1)

A control apparatus comprising:
  a first control unit configured to perform control related to a first mobile communication network operated by a first mobile communication operator; and
  a second control unit configured to perform, via the first mobile communication network, control related to mobility for a terminal apparatus connected to one or more second mobile communication networks respectively operated by one or more second mobile communication operators different from the first mobile communication operator.

(Supplementary Note 2)

The control apparatus according to supplementary note 1, wherein the second control unit is configured to control a core network node included in the one or more second mobile communication networks.

(Supplementary Note 3)

The control apparatus according to supplementary note 2, wherein the core network node is a mobility management entity (MME) node.

(Supplementary Note 4)

The control apparatus according to any one of supplementary notes 1 to 3, wherein radio communication in the one or more second mobile communication networks is performed using a radio frequency band used for radio communication in the first mobile communication network.

(Supplementary Note 5)

The control apparatus according to any one of supplementary notes 1 to 4, wherein the one or more second mobile communication networks include a plurality of second mobile communication networks.

(Supplementary Note 6)

A control method comprising:
  performing control related to a first mobile communication network operated by a first mobile communication operator; and
  performing, via the first mobile communication network, control related to mobility for a terminal apparatus connected to one or more second mobile communication networks respectively operated by one or more second mobile communication operators different from the first mobile communication operator.

(Supplementary Note 7)

A program for causing a processor to execute:
  performing control related to a first mobile communication network operated by a first mobile communication operator; and performing, via the first mobile communication network, control related to mobility for a terminal apparatus connected to one or more second mobile communication networks respectively operated by one or more second mobile communication operators different from the first mobile communication operator.

<9.2. Second Set of Supplementary Notes>
(Supplementary Note 1)
A node apparatus in a first mobile communication network operated by a first mobile communication operator, the node apparatus comprising:
 an obtaining unit configured to obtain identification information of a terminal apparatus connected to the first mobile communication network;
 a determining unit configured to determine whether the terminal apparatus is managed by a second mobile communication operator operating a second mobile communication network different from the first mobile communication network, based on the identification information; and
 a control unit configured to control charge processing related to a service provided to the terminal apparatus by the first mobile communication network, based on results of the determination.

(Supplementary Note 2)
The node apparatus according to supplementary note 1, wherein the control unit is configured to, when it is determined that the terminal apparatus is managed by the second mobile communication operator, perform control for reducing a communication fee relating to the terminal apparatus to be lower than the communication fee relating to the service provided to the terminal apparatus, as compared to when the terminal apparatus is managed by the first mobile communication network.

(Supplementary Note 3)
The node apparatus according to supplementary note 1, wherein the control unit is configured to, when it is determined that the terminal apparatus is managed by the second mobile communication operator, perform control for not charging the terminal apparatus the communication fee.

(Supplementary Note 4)
The node apparatus according to any one of supplementary notes 1 to 3, wherein the node apparatus is a core network node in the first mobile communication network.

(Supplementary Note 5)
The node apparatus according to any one of supplementary notes 1 to 4, wherein radio communication in the second mobile communication network is performed using a radio frequency band used for radio communication in the first mobile communication network.

(Supplementary Note 6)
A control method performed by a node apparatus in a first mobile communication network operated by a first mobile communication operator, the control method comprising:
 obtaining identification information of a terminal apparatus connected to the first mobile communication network;
 determining whether the terminal apparatus is managed by a second mobile communication operator operating a second mobile communication network different from the first mobile communication network, based on the identification information; and
 controlling charge processing related to a service provided to the terminal apparatus by the first mobile communication network, based on results of the determination.

(Supplementary Note 7)
A program for causing a node apparatus in a first mobile communication network operated by a first mobile communication operator to execute:
 obtaining identification information of a terminal apparatus connected to the first mobile communication network;
 determining whether the terminal apparatus is managed by a second mobile communication operator operating a second mobile communication network different from the first mobile communication network, based on the identification information; and
 controlling charge processing related to a service provided to the terminal apparatus by the first mobile communication network, based on results of the determination.

<9.3. Third Set of Supplementary Notes>
(Supplementary Note 1)
A node apparatus in a first mobile communication network operated by a first mobile communication operator, the node apparatus comprising:
 an obtaining unit configured to obtain identification information of a terminal apparatus connected to the first mobile communication network;
 a determining unit configured to determine whether the terminal apparatus is managed by a second mobile communication operator operating a second mobile communication network different from the first mobile communication network, based on the identification information; and
 a control unit configured to control communication quality related to a service provided to the terminal apparatus by the first mobile communication network, based on results of the determination.

(Supplementary Note 2)
The node apparatus according to supplementary note 1, wherein
 the control unit is configured to, when it is determined that the terminal apparatus is managed by the second mobile communication operator, perform control for enhancing the communication quality for the terminal apparatus to be higher than the communication quality for a terminal apparatus managed by the first mobile communication network.

(Supplementary Note 3)
The node apparatus according to supplementary note 2, wherein the control includes priority control for raising order of priority of a packet used for the terminal apparatus to be higher than the order of priority of the packet used for the terminal apparatus managed by the first mobile communication network.

(Supplementary Note 4)
The node apparatus according to supplementary note 2 or 3, wherein
 the control includes band control for restricting a communication band used for the terminal apparatus managed by the first mobile communication network to a predetermined bandwidth or lower.

(Supplementary Note 5)
The node apparatus according to supplementary note 1 or 2, wherein
 the control unit is configured to, when it is determined that the terminal apparatus is not managed by the second mobile communication operator, perform control for reducing the communication quality of the terminal apparatus to be lower than a predetermined value.

(Supplementary Note 6)

The node apparatus according to supplementary note 5, wherein
the control includes band control for restricting a communication band used for the terminal apparatus to a predetermined bandwidth or lower.

(Supplementary Note 7)

The node apparatus according to any one of supplementary notes 1 to 6, wherein
the node apparatus is a core network node in the first mobile communication network.

(Supplementary Note 8)

The node apparatus according to any one of supplementary notes 1 to 7, wherein
radio communication in the second mobile communication network is performed using a radio frequency band used for radio communication in the first mobile communication network.

(Supplementary Note 9)

A control method performed by a node apparatus in a first mobile communication network operated by a first mobile communication operator, the control method comprising:
obtaining identification information of a terminal apparatus connected to the first mobile communication network;
determining whether the terminal apparatus is managed by a second mobile communication operator operating a second mobile communication network different from the first mobile communication network, based on the identification information; and
controlling communication quality related to a service provided to the terminal apparatus by the first mobile communication network, based on results of the determination.

(Supplementary Note 10)

A program for causing a node apparatus in a first mobile communication network operated by a first mobile communication operator to execute:
obtaining identification information of a terminal apparatus connected to the first mobile communication network;
determining whether the terminal apparatus is managed by a second mobile communication operator operating a second mobile communication network different from the first mobile communication network, based on the identification information; and
controlling communication quality related to a service provided to the terminal apparatus by the first mobile communication network, based on results of the determination.

<9.4. Fourth Set of Supplementary Notes>

(Supplementary Note 1)

A mobile communication system comprising:
a first control apparatus comprising a control unit configured to perform, via a first mobile communication network operated by a first mobile communication operator, for a second mobile communication network operated by a second mobile communication operator different from the first mobile communication operator, control related to mobility for a terminal apparatus connected to the second mobile communication network; and
a second control apparatus comprising a first control unit configured to perform, not via another mobile communication network different from the second mobile communication network, for the second mobile communication network, control related to mobility for the terminal apparatus connected to the second mobile communication network.

(Supplementary Note 2)

The mobile communication system according to supplementary note 1, wherein the second control apparatus further comprises a second control unit configured to perform control related to communication quality for enhancing communication quality of the terminal apparatus managed by the second mobile communication operator to be higher than communication quality of the terminal apparatus managed by the first mobile communication operator.

(Supplementary Note 3)

The mobile communication system according to supplementary note 2, wherein the control related to the communication quality includes priority control for raising order of priority of a packet used for the terminal apparatus managed by the second mobile communication operator to be higher than order of priority of the packet used for the terminal apparatus managed by the first mobile communication network.

(Supplementary Note 4)

The mobile communication system according to supplementary note 2 or 3, wherein the control related to the communication quality includes band control for restricting a communication band used for the terminal apparatus managed by the first mobile communication network to a predetermined bandwidth or lower.

(Supplementary Note 5)

The mobile communication system according to supplementary note 1, wherein the second control apparatus further comprises an obtaining unit configured to obtain terminal information related to the terminal apparatus connected to the first mobile communication network from the first control apparatus.

(Supplementary Note 6)

The mobile communication system according to supplementary note 5, wherein the second control apparatus further comprises a second control unit configured to perform control related to communication quality for enhancing the communication quality of the terminal apparatus managed by the second mobile communication network to be higher than the communication quality of the terminal apparatus managed by the first mobile communication network when the second control apparatus obtains the terminal information.

(Supplementary Note 7)

The mobile communication system according to supplementary note 5 or 6, wherein the obtaining unit is configured to obtain the terminal information according to a resource of the first control apparatus.

(Supplementary Note 8)

The mobile communication system according to any one of supplementary notes 1 to 7, wherein radio communication in the second mobile communication network is performed using a radio frequency band used for radio communication in the first mobile communication network.

(Supplementary Note 9)

A control method comprising:
performing, by a first control apparatus, via a first mobile communication network operated by a first mobile communication operator, for a second mobile communication network operated by a second mobile communication operator different from the first mobile communication operator, control related to mobility for a terminal apparatus connected to the second mobile communication network; and performing, by a second control apparatus, not via another mobile communication network different from the second mobile communication network, for the second mobile communication network, control related to mobility for the terminal apparatus connected to the second mobile communication network.

This application claims priority based on JP 2020-062965 filed on Mar. 31, 2020, the entire disclosure of which is incorporated herein.

INDUSTRIAL APPLICABILITY

In a mobile communication system including a plurality of mobile communication networks respectively operated by a plurality of mobile communication operators, cooperation can be appropriately performed among the respective mobile communication networks.

REFERENCE SIGNS LIST

| | |
|---|---|
| 1, 2 | System |
| 3 | Mobile Communication System |
| 1a | First Mobile Communication Network |
| 1b | Second Mobile Communication Network |
| 100, 100a-b, 150, 800 | Control Apparatus |
| 170 | First Control Apparatus |
| 200, 200a-b, 250, 270, 400, 400a-b | Core Network Node Apparatus |
| 600, 600a-b, 700, 700a-b | Terminal Apparatus |
| 850 | Second Control Apparatus |
| 131, 231, 251, 271, 831 | Obtaining Unit |
| 133, 151, 833, 851 | First Control Unit |
| 135, 153, 835 | Second Control Unit |
| 233, 253, 273 | Determining Unit |
| 171, 235, 255, 275 | Control Unit |

What is claimed is:

1. A mobile communication system comprising:
a first control apparatus comprising
a memory storing instructions and one or more processors configured to execute the instructions to perform,
via a first mobile communication network operated by a first mobile communication operator,
for a second mobile communication network operated by a second mobile communication operator different from the first mobile communication operator,
control related to mobility for a terminal apparatus connected to the second mobile communication network; and
a second control apparatus comprising
a memory storing instructions and one or more processors configured to execute the instructions perform,
not via another mobile communication network different from the second mobile communication network,
for the second mobile communication network, control related to mobility for the terminal apparatus connected to the second mobile communication network,
wherein the one or more processors of the second control apparatus are further configured to execute the instruction to perform control related to communication quality for enhancing communication quality of the terminal apparatus managed by the second mobile communication operator to be higher than communication quality of the terminal apparatus managed by the first mobile communication operator, and
wherein the control related to the communication quality includes band control for restricting a communication band used for the terminal apparatus managed by the first mobile communication network to a predetermined bandwidth or lower.

2. The mobile communication system according to claim 1, wherein the control related to the communication quality includes priority control for raising order of priority of a packet used for the terminal apparatus managed by the second mobile communication operator to be higher than order of priority of the packet used for the terminal apparatus managed by the first mobile communication network.

3. The mobile communication system according to claim 1, wherein the one or more processors of the second control apparatus are further configured to execute the instruction to obtain terminal information related to the terminal apparatus connected to the first mobile communication network from the first control apparatus.

4. The mobile communication system according to claim 3, wherein the one or more processors of the second control apparatus are further configured to execute the instruction to perform control related to communication quality for enhancing the communication quality of the terminal apparatus managed by the second mobile communication network to be higher than the communication quality of the terminal apparatus managed by the first mobile communication network when the second control apparatus obtains the terminal information.

5. The mobile communication system according to claim 3, wherein the one or more processors of the second control apparatus are configured to execute the instruction to obtain the terminal information according to a resource of the first control apparatus.

6. The mobile communication system according to claim 1, wherein radio communication in the second mobile communication network is performed using a radio frequency band used for radio communication in the first mobile communication network.

7. A control method comprising:
performing, by a first control apparatus,
via a first mobile communication network operated by a first mobile communication operator,
for a second mobile communication network operated by a second mobile communication operator different from the first mobile communication operator,
control related to mobility for a terminal apparatus connected to the second mobile communication network;
performing, by a second control apparatus,
not via another mobile communication network different from the second mobile communication network,
for the second mobile communication network, control related to mobility for the terminal apparatus connected to the second mobile communication network;
performing, by the second control apparatus, control related to communication quality for enhancing communication quality of the terminal apparatus managed by the second mobile communication operator to be higher than communication quality of the terminal apparatus managed by the first mobile communication operator,
wherein the control related to the communication quality includes band control for restricting a communication band used for the terminal apparatus managed by the first mobile communication network to a predetermined bandwidth or lower.

* * * * *